United States Patent [19]

MacWilliams et al.

[11] 4,126,480

[45] Nov. 21, 1978

[54] AQUEOUS SUSPENSIONS

[75] Inventors: Dalton C. MacWilliams, Alamo, Calif.; James R. Wirt, Midland, Mich.

[73] Assignee: The Dow Chemical Company, Midland, Mich.

[21] Appl. No.: 881,480

[22] Filed: Feb. 27, 1978

Related U.S. Application Data

[63] Continuation of Ser. No. 644,381, Dec. 29, 1975, abandoned.

[51] Int. Cl.$^2$ .............................................. C04B 7/02
[52] U.S. Cl. .................................................. 106/100
[58] Field of Search ........................................ 106/100

[56] References Cited

U.S. PATENT DOCUMENTS

| | | | |
|---|---|---|---|
| 2,111,517 | 3/1938 | Vogel-Jorgensen | 106/100 |
| 2,587,044 | 2/1952 | Heilmann | 106/100 |
| 3,923,717 | 12/1975 | Lalk et al. | 106/90 |

*Primary Examiner*—James Poer
*Attorney, Agent, or Firm*—G. D. Street

[57] ABSTRACT

Water-soluble copolymers prepared from styrene and maleic anhydride and the water-soluble salts and partial esters thereof function synergistically with inorganic salts to obtain superior reduction of water demand of dispersed inorganic solids. The disclosed invention is particularly adapted for use in the wet-grinding process for preparing portland cement.

23 Claims, No Drawings

AQUEOUS SUSPENSIONS

This is a continuation of application Ser. No. 644,381, filed Dec. 29, 1975, now abandoned.

BACKGROUND OF THE INVENTION

The present invention relates to the use of particular styrene-maleic anhydride copolymers and inorganic salt dispersant materials to achieve a reduction in the water demand of finely-divided solids in water. It relates particularly to this use as an improvement in the wet process production of portland cement.

It is known that copolymers of maleic anhydride and divinyl ether, ethylene, propylene butylene and isobutylene or mixtures of olefins and hexadiene-1,5 function as water-loss preventives in drilling fluids. See U.S. Pat. No. 3,157,599.

The above copolymers have also been employed with alkali metal compounds in preparing beneficated clay compositions for use in drilling fluids. U.S. Pat. No. 3,216,934 teaches the use of such copolymers with from about 1 to about 7 percent by weight of an alkali metal salt such as, for example, alkali metal carbonates, hypophosphites, oxalates, phosphates, silicates, sulfites and tartrates, to increase yields of clay. Similarly, U.S. Pat. No. 3,220,946 discloses the use of such maleic anhydride copolymers and certain alkali metal salts in clay benefication of sodium bentonites only. Salts selected from the group consisting of sodium formate, calcium formate, calcium acetate, sodium thiocyanate, sodium sulfate, magnesium sulfate, calcium sulfate, lithium sulfate and potassium sulfate are employed to provide a postulated synergistic response with the copolymer in changing the rheological properties of clay. Salts such as sodium chloride, sodium bicarbonate, calcium carbonate and calcium chloride, however, are taught as being ineffective for such uses.

It is also known that styrene-maleic anhydride copolymers are useful as water demand reducing agents in the wet process for producing portland cement. Such copolymers are employed in amounts from about 0.01 to about 0.1 weight percent. See U.S. Pat. No. 3,923,717.

A two-part study by the Portland Cement Association, Chicago, Ill., entitled "Slurry Thinners" (Part I, Clausen et al., May 1953; Part II by Dersnah, March 1955) discloses the evaluation of various inorganic salt dispersants and mixtures thereof with other surface active agents in reducing the water content of cement slurries in wet process applications.

Only the above Portland Cement Association Study and the U.S. Pat. No. 3,923,717 relate to the wet grinding process for making portland cement, wherein limestone and clay and, optionally, a small amount of iron oxide are ground in the presence of water to obtain a slurry of very fine particles. This slurry is then fed into a high temperature kiln where it is dried and calcined to form the clinker which is then ground to make portland cement. The water demand of the finely ground limestone-clay slurry is fairly high and ordinarily requires a relatively large proportion of water, for example, about 30–50% by weight, usually from about 25 to about 35 wt. %, to obtain a fluid, pumpable slurry. This limits the rate at which the slurry can be processed and fed to the kiln and it also requires a larger amount of fuel to dry and calcinate a given quantity of solids to the clinker stage.

Many substances with dispersant activity are available and have been tried in order to decrease the water demand of suspended inorganic solids in various high solids water suspensions or slurries for various applications. Most of these, particularly in the wet process for making portland cement, have proven relatively ineffective or undesirable for one reason or another. Complex phosphates are undesirable because they tend to hydrolyze at the warm temperatures developed during grinding and in storage of the slurry and because of the adverse effect of residual phosphate on the properties of the final portland cement product. Lignosulfonates have been tried for this use, but these require high addition levels for only marginal improvement. The also lose their activity rapidly during storage of the slurry. Many materials are also too expensive to be economically utilized in such operations.

We have now found, however, that the water demand of suspended inorganic solids necessary to make a pumpable slurry in the wet grinding process for making cement can be significantly reduced by use of water-demand reducing agent as described below.

SUMMARY OF THE INVENTION

We have discovered that mixtures of water-soluble salts of styrene-maleic anhydride copolymers and an inorganic compound, such as alkali metal or ammonium salts of carbonates, bicarbonates, oxalates, silicates, aluminates and borates, which form insoluble salts with calcium, are unexpectedly effective for reducing the water demand of solids suspended in water while so maintaining desired pumpability levels of high solids-content aqueous suspensions, particularly those encountered in the wet process for making portland cement. The action of the copolymers of styrene-maleic anhydride (hereinafter "SMA") in combination with the selected inorganic compound (hereinafter collectively referred to from time to time as "water-demand reducing system or agent(s)") represents true synergism, said combinations effectively reducing the water demand of suspended solids at concentrations where neither additive alone is as effective.

These water-demand reducing agents are extremely effective for reducing water demand while maintaining desired viscosity levels for pumping purposes in various kinds of high solids suspensions in water of finely divided minerals, particularly in raw cement slurries consisting largely of limestone and clay, usually with a small amount of iron oxide. In this latter application especially, the above-described water-demand reducing agent has a unique combination of efficiency, stability and compatability in the wet grinding process slurries together with a lack of any adverse effects in the calcining process. A reduction in water content can be achieved so that, with the same volume feed to the cement kiln increases in production can be obtained with lower fuel costs. Increasing the feed rate to the kiln while operating at normal fuel input results in even further increases in clinker production. Retardation of set times are also obtained with the water-demand reducing system when recycle kiln dust (calcium oxide) is added to fresh cement kiln feed.

DETAILED DESCRIPTION OF THE INVENTION

The copolymers which are useful in the present invention can be made by known processes. U.S. Pat. No. 2,606,891 discloses a process in which styrene and maleic anhydride are dissolved in an inert organic solvent, such as acetone, dioxane or a liquid ester. 1 to 40% of a soluble mercaptan of 5 to 22 carbon atoms, and 0.25 to 5% of a known organic peroxide catalyst are added. The mixture is then heated to 50°–150° C.

U.S. Pat. No. 2,640,891 discloses a process in which a mixture of styrene and maleic anhydride is mass copolymerized in the presence of 0.01 to 2 weight percent of 2,5-ditertiary butyl parabenzoquinone. The polymerization can be effected by heating or by a combination of heat and a known organic peroxide catalyst.

A third method is disclosed in U.S. Pat. No. 3,085,994. The styrene, maleic anhydride and an organic peroxide catalyst are dissolved in an alkyl benzene in which the alkyl group has at least 2 carbons, such as ethylbenzene, cumene or $\Psi$-cymene, and the mixture is heated to 85°–120° C. The alkyl aromatic is a solvent for the monomers, but a non-solvent for the low molecular weight copolymer.

It is to be understood, however, that the process of making the styrene-maleic anhydride copolymer is not critical to this invention. Any styrene-maleic anhydride copolymer, within the molecular weight range and the mole ratio specified herein can be used, without regard to its method of preparation. The water content of the finished slurry can be as low as 25% and as high as 35% by weight.

The styrene-maleic anhydride copolymer product is used in the form of a water-soluble salt, usually the sodium salt. Other such salts, for example, the potassium and ammonium salts will also serve, but not as well as the sodium salt. Surprisingly, these copolymeric salts are very effective in maintaining fluidity of the aqueous high solids mineral suspensions.

The water-soluble inorganic salts of copolymers of styrene and maleic anhydride which can be used in the present invention are those having a molecular weight of from about 1000 to about 5000. These copolymers are further characterized by a ratio of from about 50–67 mole percent of styrene and 50–33 mole percent of maleic anhydride. The preferred copolymer molecules have a molecular weight of from about 1200 to about 3000 with a mole ratio of styrene to maleic anhydride of 1:1. These are particularly effective as a component of the water-demand reducing system for limestone-clay suspensions used in wet grinding process for making cement.

The inorganic compound employed in the water-demand reducing system is a water-soluble salt of ammonium or an alkali metal radical which will form an insoluble salt with calcium and acts synergistically with the SMA copolymer. The water-soluble inorganic salts which may be employed in the present invention are those which form insoluble salts with calcium and are selected from the group consisting of alkali metal salts, i.e., sodium and potassium salts, of aluminates, borates, oxalates, carbonates, bicarbonates and silicates and ammonium salts of borates, oxalates, carbonates, and bicarbonates. Alkali metal silicate salts, especially orthosilicates, are preferred as they exhibit the least tendency for the viscosity improvement to show some tendency to diminish upon standing for periods of 18 hours or more although such viscosity reversion tendency is a significant factor to consider where slurries are temporarily stored prior to processing. Especially preferred are the alkali metal carbonate, bicarbonate and silicate and ammonium carbonate and bicarbonate salts. Where more alkaline slurries are employed, or where kiln dust having a high calcium oxide content is recycled to the slurry, the meta silicate and waterglass silicate salt forms are preferred whereas the orthosilicate form is desirably employed in less alkaline slurries. Similar considerations as to slurry alkalinity apply where less basic ammonium salts are employed.

The water-demand reducing agents of the present invention can be added to the cement slurry sequentially or as a premixed solution. When added sequentially, it is desirable that the inorganic salt be added first, followed by the SMA copolymer. Preferably, the agents are added sequentially to the slurry, although the premix will be advantageous in certain situations.

In general any combinations of the SMA copolymer and of the inorganic salt which act synergistically to reduce the water demand of high solids-content aqueous suspensions are considered to be within the scope of the present invention. Generally, ratios of the SMA copolymer salt: inorganic salt range from about 1:1 to as high as about 1:10 although ratios of from 1:1 to about 1:6 are preferred. An especially preferred ratio range is from 1:1 to about 1:4. A ratio of 1:3 constitutes a preferred embodiment. The ratio employed will, as those skilled in the art will recognize, vary depending upon the concentration of the water-demand reducing system employed, the viscosity required for a particular operation, the grinding time, the type and composition of cement slurry being treated, and the like. Generally, in treating certain portland cement slurries, it has been found that concentrations of from about 0.0025 to about 0.0125 weight percent (based on slurry solids) of the SMA copolymer salt used in combination with from about 0.008 to about 0.04 weight percent inorganic salt produce synergistic reduction of slurry water-demand. In a preferred embodiment, concentrations of from about 0.003 to about 0.009 weight percent SMA copolymer salt and from about 0.009 to about 0.02 weight percent inorganic salt are employed. In another embodiment, SMA copolymer salt concentrations of from about 0.003 to about 0.006 weight percent and inorganic salt concentrations of from about 0.009 to about 0.02 weight percent are preferred.

Those skilled in the art will recognize that it is difficult to establish any one preferred concentration range for the SMA copolymers and inorganic salts as this will depend upon the viscosity required for a particular operation as well as the particular type of high solids suspension being treated. There are, for example, many different types of known and commercially available cement slurries of varying compositions which can be treated according to the present invention. The desired synergistic concentrations can readily be determined by those skilled in the art according to known procedures and by those illustrated in the example set forth below.

In the wet process for making portland cement, the raw materials, including ingredients such as limestone, dolomite, oyster shells, blast furnace slag or other well known high calcium-containing products, are mixed with silicious materials, including slag, clay, shale or any other silica containing ingredient in amounts such that the calcium and silica materials constitute about 85% by weight of the clinker formed after heating in a kiln. The remaining ingredients include aluminum-containing and iron-containing ingredients. The mixture of raw ingredients, using well-known process steps, is ground with the addition of water to prepare an aqueous kiln feed slurry, which is then screened and pumped into storage silos preparatory to further blending with other slurries or feeding into a clinkering kiln. Usually, the portion which passes a 200 mesh screen is used for preparing the clinker. Such slurries usually contain from 30–50% water by weight.

On an emperical basis, the cements made by grinding the resulting clinker will contain
$SiO_2$: 19–23%
$Al_2O_3$: 4–8%
$Fe_2O_3$: 1.5–6%
$CaO$: 62–67%
$MgO$: 0.6–5%

Pumpable aqueous kiln feed slurry compositions containing SMA copolymer: inorganic salt ratios of from 1:1 to about 1:10, preferably from about 1:1 to about 1:4, constitute preferred embodiments in the wet process for making portland cement. Preferably, such slurry compositions contain from about 0.0025 to about 0.0125 weight percent SMA copolymer salt and from about 0.008 to about 0.04 weight percent inorganic salt. Premix concentrate compositions containing SMA copolymer: inorganic salt ratios of from 1:1 to about 1:10, preferably about 1:1 to about 1:4, and most preferably about 1:3, constitute additional embodiments of the present invention.

The following example is presented to illustrate the invention, but is not to be construed as limiting it in any manner whatsoever. The weight percent (wt. %) of water demand reducing agents, unless otherwise specified is based on the solids present in the slurry being treated.

EXAMPLE 1

A wet portland cement slurry obtained from a commercial source contained about 34 percent by weight water. The viscosity was determined by a Brookfield LTV viscometer employing a #5 spindle at 20 RPM after 60 seconds of stirring. As received, this slurry was determined to have a viscosity of about 16,800 cps. A 30 weight % aqueous solution comprising one part of the disodium salt of a 1:1 mole ratio of styrene-maleic anhydride copolymer having a molecular weight of about 1600 and three parts by weight $Na_2SiO_3$ was added in varying small amounts to samples of the slurry and the viscosity determined as above. The following results (weight % being based on slurry solids) were recorded:

| Run No. | Wt. % SMA Copolymer | Wt. % $Na_2SiO_3$ | Viscosity (cps) |
| --- | --- | --- | --- |
| *0 | 0 | 0 | 16,800 |
| a | .0028 | .0085 | 9,200 |
| b | .0057 | .0170 | 3,000 |
| c | .0068 | .0205 | 2,000 |
| d | .0079 | .0239 | 1,000 |
| e | .0091 | .0273 | 500 |
| f | .0102 | .0306 | ~340 |
| g | .0113 | .0341 | ~200 |
| a-a | .0114 | 0 | 9,800 |
| b-b | .0227 | 0 | 4,500 |
| c-c | .0273 | 0 | 3,400 |
| d-d | .0318 | 0 | 2,400 |
| e-e | .0365 | 0 | 1,800 |
| f-f | .0409 | 0 | 1,200 |
| g-g | .0455 | 0 | 800 |

*= control

Comparing runs a–g with runs a—a through g—g, it is seen that the total concentration of the SMA-$Na_2SiO_3$ system is the same as the concentration of the SMA copolymer utilized alone. The synergistic effect of the SMA-$Na_2SiO_3$ system is evident from these data, the SMA-$Na_2SiO_3$ system requiring only about one-fourth (or about a 75% decrease) the concentration of the expensive SMA copolymer to obtain slurries having (a) substantially the same or better viscosities than obtained with the SMA copolymer alone in larger quantities, and (b) the same water content as the high viscosity control sample but which instead have viscosities which render the slurries readily pumpable.

The above experiments demonstrate the synergistic action of the water-demand reducing system of the present invention in lowering the high viscosity (without addition of water) of the higher solids density slurries to manageable ranges, thus providing for the use of slurries having higher solids densities and attendant benefits as discussed herein.

In commercial operations, the water-demand reducing system is usually added once the slurry or slurries are formed in the grinding operations. Preferably, the system is added to the slurry formed after grinding.

Similar results can be obtained with SMA copolymers and inorganic salts specified herein. Having disclosed our invention, it is apparent to those skilled in the art that modifications may be made which do not depart from the spirit of the invention. The specific experiments presented in this disclosure are illustrative of the invention and are not intended to be limitations upon the true scope of the invention.

What is claimed is:

1. In the wet process for the production of cement solids wherein limestone and clay are ground in the presence of water to form a pumpable kiln feed slurry, the improvement which comprises adding to said slurry an amount of a water-demand reducing system sufficient to synergistically reduce the water demand of said slurry, said system comprising (1) a water soluble salt of a styrene-maleic anhydride copolymer having a molecular weight of from about 1000 to about 5000 and being characterized by a ratio of from about 50 to about 67 mole percent of styrene and from about 50 to about 33 mole percent of maleic anhydride and (2) a compound selected from the group consisting of alkali metal carbonates, bicarbonates, oxalates, silicates, aluminates and borates and ammonium carbonates, bicarbonates, oxalates and borates, (1) and (2) being employed in a ratio of from about 1:1 to about 1:10 by weight.

2. The process of claim 1 wherein the copolymer has a molecular weight of from about 1200 to about 3200 with a mole ratio of styrene to maleic anhydride of 1:1.

3. The process of claim 1 wherein the compound is selected from the group consisting of alkali metal carbonate, bicarbonate and silicate and ammonium carbonate and bicarbonate.

4. The process of claim 2 wherein the compound is selected from the group consisting of alkali metal carbonate, bicarbonate and silicate and ammonium carbonate and bicarbonate.

5. The process of claim 1 wherein the compound is an alkali metal or ammonium carbonate.

6. The process of claim 2 wherein the compound is an alkali metal or ammonium carbonate.

7. The process of claim 1 wherein the compound is an alkali metal silicate.

8. The process of claim 2 wherein the compound is an alkali metal silicate.

9. The process of claim 1 wherein the copolymer and compound are employed in a ratio of from 1:1 to about 1:6.

10. The process of claim 1 wherein the copolymer and compound are employed in a ratio of from 1:1 to about 1:4.

11. The process of claim 1 wherein the copolymer and compound are employed in a ratio of 1:3.

12. The process of claim 2 wherein the copolymer and compound are employed in a ratio of from 1:1 to about 1:10.

13. A pumpable kiln feed slurry useful in a wet process portland cement, said slurry containing sufficient amounts of a water-demand reducing system to synergistically reduce the water demand thereof, said system comprising (1) a water-soluble salt of a styrene-maleic anhydride copolymer having a molecular weight of from about 1000 to about 5000 and being characterized by a ratio of from about 50 to about 67 mole percent of styrene and from about 50 to about 33 mole percent of maleic anhydride and (2) a compound selected from the group consisting of alkali metal carbonates, bicarbonates, oxalates, borates, aluminates, and silicates and ammonium carbonates, bicarbonates, oxalates and borates, (1) and (2) being employed in a ratio of from about 1:1 to about 1:10 by weight.

14. The slurry of claim 13 wherein the compound is selected from the group consisting of alkali metal carbonate, bicarbonate and silicate and ammonium carbonate and bicarbonate.

15. The slurry of claim 14 wherein the compound is an alkali metal or ammonium carbonate.

16. The slurry of claim 14 wherein the compound is an alkali metal silicate.

17. The slurry of claim 13 wherein the copolymer and compound are employed in a ratio of from 1:1 to about 1:10.

18. The slurry of claim 13 wherein the copolymer and compound are employed in a ratio of from 1:1 to about 1:6.

19. The slurry of claim 13 wherein the copolymer and compound are employed in a ratio of from 1:1 to about 1:4.

20. The slurry of claim 13 wherein the copolymer and compound are employed in a ratio of 1:3.

21. The slurry of claim 15 wherein the copolymer and compound are employed in a ratio of 1:3.

22. The slurry of claim 16 wherein the copolymer and compound are employed in a ratio of 1:3.

23. An aqueous concentrate water-demand reducing system comprising a water soluble salt of a styrene-maleic anhydride copolymer having a molecular weight of from about 1000 to about 5000 and being characterized by a ratio of from about 50 to about 67 mole percent of styrene and from about 50 to about 33 mole percent of maleic anhydride and a compound selected from the group consisting of alkali metal bicarbonates, carbonates, oxalates, borates, aluminates and silicates and ammonium carbonates, bicarbonates, oxalates and borates in a ratio of copolymer to inorganic compound of from 1:1 to about 1:10 by weight.

* * * * *

UNITED STATES PATENT AND TRADEMARK OFFICE
CERTIFICATE OF CORRECTION

PATENT NO. : 4,126,480
DATED : November 21, 1978
INVENTOR(S) : Dalton C. MacWilliams et al.

It is certified that error appears in the above-identified patent and that said Letters Patent are hereby corrected as shown below:

Column 2, line 14, "The" should be -- They --.

Column 5, table in Example 1, Run No. e-e ".0365" should be -- .0364 --.

Signed and Sealed this

Twelfth Day of June 1979

[SEAL]

Attest:

RUTH C. MASON
Attesting Officer

DONALD W. BANNER
Commissioner of Patents and Trademarks